United States Patent [19]

Noda et al.

[11] 4,370,666

[45] Jan. 25, 1983

[54] THERMAL HEAD DRIVING DEVICE

[75] Inventors: Atsushi Noda; Takayoshi Hanagata, both of Yokohama, Japan

[73] Assignee: Canon Kabushiki Kaisha, Tokyo, Japan

[21] Appl. No.: 173,888

[22] Filed: Jul. 31, 1980

[30] Foreign Application Priority Data

Aug. 10, 1979 [JP] Japan ................................ 54/102626

[51] Int. Cl.³ ............................................ G01D 15/10

[52] U.S. Cl. ................................ 346/76 PH; 219/216

[58] Field of Search .................... 346/76 PH; 219/216; 400/120

[56] References Cited

U.S. PATENT DOCUMENTS

| | | | |
|---|---|---|---|
| 3,577,137 | 5/1971 | Brennan, Jr. | 346/76 PH |
| 3,777,116 | 12/1973 | Brescia et al. | 346/76 PH X |
| 4,113,391 | 9/1978 | Minowa | 346/76 PH X |

*Primary Examiner*—G. Z. Rubinson

*Assistant Examiner*—W. J. Brady

*Attorney, Agent, or Firm*—Fitzpatrick, Cella, Harper & Scinto

[57] ABSTRACT

A thermal head driving device is provided with a safety circuit for preventing the heating resistors of a thermal head from being burnt or reduced in life by an abnormal printing pulse signal being applied to the heating resistors. The device is also provided with a temperature correcting circuit for controlling the heating temperature of the heating resistors to prevent the printing density of the thermal head from being varied under the influence of the ambient temperature. The device is further provided with a compensation circuit for varying the printing conditions graded for each range of resistance values of the heating resistors in a plurality of thermal heads to prevent a difference in printing density from being caused by the difference between said resistance values. At least two of the safety circuit, the temperature correcting circuit and the compensation circuit are combined.

15 Claims, 6 Drawing Figures

THERMAL HEAD DRIVING DEVICE

BACKGROUND OF THE INVENTION

1. Field of the Invention

This invention relates to a thermal head driving device in which a plurality of heating resistors are arranged and a printing pulse signal is caused to flow to the resistors to thereby cause the resistors to heat, thus effecting the printing.

2. Description of the Prior Art

A thermal head is generally incorporated in the printer of a small electronic desk-top calculator or the like and receives a printing pulse of several milliseconds obtained from the control circuit of the calculator. During application of the pulse, the temperature of heating resistors constituting the thermal head rises to the order of 300° C., whereby printing is effected on thermosensitive recording paper to record the result of the operation of the desk-top calculator.

Accordingly, application of a printing pulse having a pulse width greater than a predetermined pulse width would cause burning or reduced life of the heating resistors and therefore, for example, where the control circuit fails and an abnormal printing pulse signal is generated, a safety circuit for protecting the thermal head against such abnormality will become necessary.

Further, the thermal head is such that the resistors thereof are caused to heat as described above, whereby printing is effected on thermosensitive paper and therefore, the printing density printed on the thermosensitive paper is greatly affected by the ambient temperature surrounding the thermal head. Accordingly, in order to keep constant the printing density obtained on the thermosensitive recording paper in spite of the temperature difference around the thermal head, a temperature correcting circuit becomes necessary which controls the heating temperature of the heating resistors in accordance with the ambient temperature.

Further, since the thermal head comprises a plurality of heating resistors, some degree of irregularity occurs to the resistance values of the heating resistors, similar to ordinary resistance elements, during the manufacture thereof. Accordingly, in order to eliminate the difference in printing density resulting from the difference in resistance value between thermal heads, the resistance values must be made as uniform as possible and for this purpose, a compensation circuit or a grading circuit becomes necessary which grades (classifies the grade or quality) the heating resistors of the thermal head for each of certain ranges of resistance value and varies the printing condition (the printing pulse width or the printing voltage) by each grade.

Thus, the above-mentioned three types of circuits are very important in order to effect highly reliable printing of good quality on thermosensitive paper by the use of a thermal head and thereby record information, whereas the thermal head driving device of the conventional printer has only one of these three types of circuits and could not well cope with various manufacturing conditions or operating conditions.

SUMMARY OF THE INVENTION

It is a first object of the present invention to prevent burning or reduced life of the heating resistors in a thermal head.

It is a second object of the present invention to prevent the printing density of the thermal head from being varied under the influence of the ambient temperature.

It is a third object of the present invention to provide printing conditions suited for each grade of the heating resistors graded for each range of resistance value.

It is a fourth object of the present invention to combine the above-described first to third objects to thereby improve the printing quality and reliability.

The invention will become fully apparent from the following detailed description thereof taken in conjunction with the accompanying drawings.

DESCRIPTION OF THE PREFERRED EMBODIMENT

The present invention overcomes the disadvantages peculiar to the prior art device and provides a thermal head driving device which is provided with at least two of the previously described safety circuit, temperature correcting circuit and compensation circuit and yet is simple in construction and inexpensive.

Figure 1:
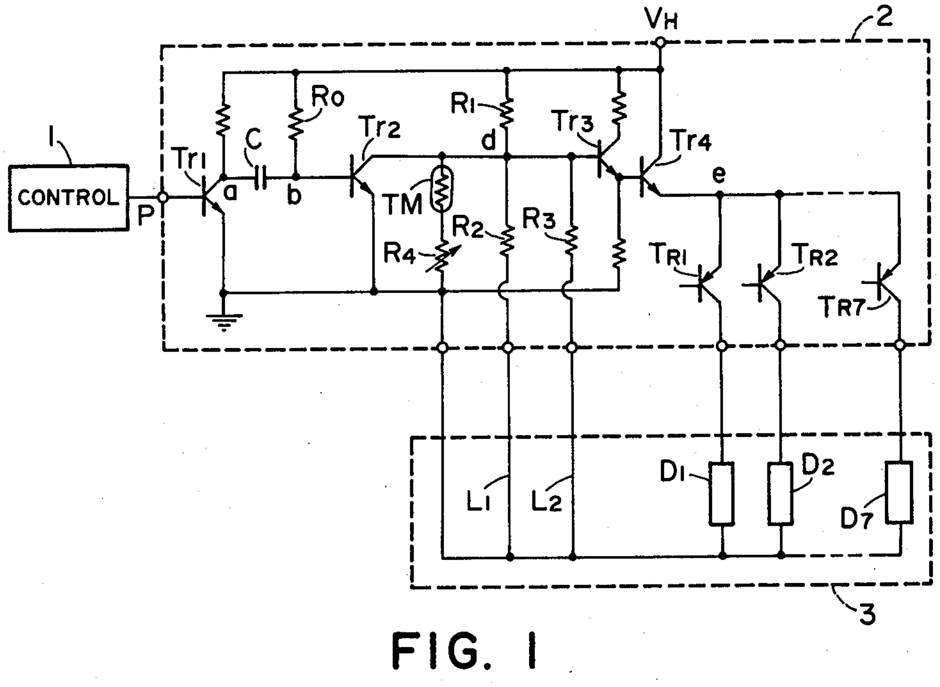
FIG. 1 is an electric circuit diagram schematically showing the thermal head driving device of the present invention.

An embodiment of the present invention will hereinafter by described with reference to the drawings. As shown in FIG. 1, the thermal head driving device of the present invention receives a printing signal P from a control circuit 1 and on the basis thereof, drives a printing head 3 comprising a plurality of heating resistors $D_1$–$D_7$. The control circuit 1 is provided, for example, within an electronic instrument such as an electronic desk-top calculator and generates a signal having a pulse width $T_{P1}$ as shown in FIG. 2(A), in accordance with the information to be printed. The driving circuit 2 has a transistor $Tr_1$ which performs the function of an inverter, and by this transistor, the printing signal P applied from the control circuit has its phase inverted as shown in FIG. 2(B). This printing signal having had its phase inverted is connected to one terminal a of a capacitor C. The other terminal b of this capacitor C is connected to a source voltage $V_H$ through a resistor $R_O$ and also to the base of a transistor $Tr_2$. This capacitor C and resistor $R_O$ together constitute an index waveform circuit and the output of this index waveform circuit, namely, the signal appearing at the junction b, assumes a waveform as shown in FIG. 2(C). The emitters of the transistors $Tr_1$ and $Tr_2$ are grounded.

The output, i.e. collector, of the transistor $Tr_2$ is connected to the base of a transistor $Tr_3$ which constitutes a driving transistor. The source voltage $V_H$ is applied to the collector side terminal d of the transistor $Tr_2$ through a bias resistor $R_1$. Further, a thermistor TM and grading resistors $R_2$, $R_3$ are connected to the collector side terminal d, and the other end of the thermistor TM is grounded through a regulating resistor $R_4$, and the grading resistors $R_2$ and $R_3$ are likewise grounded through lines $L_1$ and $L_2$ on the thermal head 3. The waveform of the signal appearing at the collector d of the transistor $Tr_2$ is such as shown in FIG. 2(D).

The output of the driving transistor $Tr_3$ is connected to the base of a current supplying transistor $Tr_4$ and the source voltage $V_H$ is applied to the collector of this transistor $Tr_4$, the emitter side terminal e of which is connected to the heating resistors $D_1, D_2, \ldots, D_7$ of the thermal head 3 through switching transistors $T_{R1}$, $T_{R2}$, $\ldots$, $T_{R7}$. The other ends of these heating resistors of the thermal head being grounded. The waveform appearing at the output terminal e of the transistor $T_{R4}$ is shown in FIG. 2(E). When the switching transistors $T_{R1}$ to $T_{R7}$ are operated and a current flows to the respective heating resistor, the heating resistor heats (about 300° C.) and when this heating resistor has been urged against thermosensitive recording paper, the printing conforming to the shape of that resistor is effected on the recording paper. As is generally well-known, these heating resistors are arranged in a row at a predetermined interval, and a predetermined heating resistor is driven in synchronism with the head feeding, and the dots constituted by that driven resistor are recorded on the recording paper.

Figure 2:
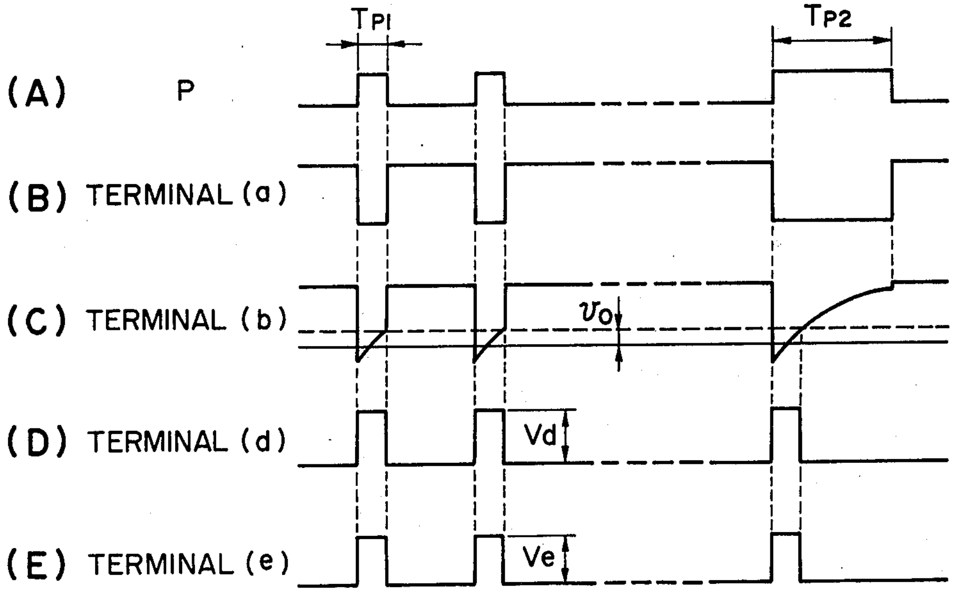
FIGS. 2(A) to (E) are signal waveform diagrams for illustrating the operation of the FIG. 1 circuit.

The operation of the thermal head driving device of the present invention constructed as described above will now be described with reference to the signal waveforms shown in FIG. 2.

When a printing pulse signal P having a pulse width $T_{P1}$ is put out from the control circuit 1, the phase of this signal is inverted by the transistor $Tr_1$ and the waveform shown in FIG. 2(B) appears at the terminal a. The signal appearing at this terminal a is passed through the index waveform circuit comprising the capacitor C and the resistor $R_O$, whereby there is obtained an index waveform as shown in FIG. 2(C). The shape of this index waveform is determined by the capacity of the capacitor C and the resistance value of the resistor $R_O$. If the voltage appearing at the terminal b when the printing pulse signal has terminated is $V_O$ and the values of the capacitor C and bias resistor $R_O$ are set so that the voltage $V_O$ is equal to the conduction voltage of the transistor $Tr_2$, then the transistor $Tr_2$ conducts when the voltage appearing at the terminal b becomes $V_O$ and therefore, the signal appearing at the output d of the transistor $Tr_2$ becomes a rectangular wave having a pulse width $T_{P1}$ as shown in FIG. 2(D).

Even if the control circuit 1 fails for some reason or other and there has been put out a printing pulse signal having an pulse width $T_{P2}$ abnormally longer than a predetermined pulse width as shown at the right-hand side of FIG. 2(A), the voltage appearing at the terminal b is varied for increase in the fashion of an exponential function, but when that voltage has become $V_O$, the transistor $Tr_2$ already conducts and therefore, a rectangular wave having a proper pulse width $T_{P1}$ is always obtained at the terminal d and thus, there is obtained the function of a safety circuit protecting the failure of the control circuit.

Since the thermistor TM is connected to the base side terminal d of the transistor $Tr_3$, the bias voltage Vd at the terminal d can be varied in accordance with the ambient temperature, and a head application voltage Ve for obtaining a proper printing density independently of the ambient temperature is put out at the emitter side of the current supplying transistor $Tr_4$. That is, the value of the head application voltage Ve becomes equal to the bias voltage Vd minus the voltage drops of the transistor $Tr_3$ and current supplying transistor $Tr_4$, and the current flowing to the heating resistors $D_1$–$D_7$ assumes a substantially constant current value without being affected by the ambient temperature, thus enabling the printing of proper density to be accomplished. In this manner, there is obtained the function of a temperature correcting circuit.

Further, since the grading resistors $R_2$ and $R_3$ are connected to the terminal d, the signal lines $L_1$ and $L_2$ of the thermal head 3 may be selectively disconnected for each grade of the resistance value of the thermal head 3 caused by a manufacturing error or the like, whereby the combined resistance of the bias resistor group of the transistor $Tr_3$ may be varied to vary the bias voltage Vd at the terminal d, thereby obtaining a proper head application voltage Ve. That is, by this, there is provided a compensation circuit or a grading circuit which automatically produces a head application voltage Ve of proper printing density for each thermal head. In some cases, a greater number of grading resistors may be provided and signal lines corresponding thereto may be selectively disconnected to effect a greater number of gradings, thus enabling the quality of the thermal head resulting from a manufacturing error to be maintained substantially constant.

In the above-described embodiment, all of the safety circuit, the temperature correcting circuit and the grading circuit of the thermal head are provided, but even if design is made such that the heating resistors are driven through two of these circuits, there may be provided a printer which is better in printing quality and higher in reliability than a printer using the conventional thermal head driving device.

According to the present invention, as has been described above in detail, the heating resistors of the thermal head are driven through at least two of the safety circuit for keeping the printing pulse width from the control circuit below a predetermined value, the temperature correcting circuit for obtaining a substantially constant proper head application voltage independently of the ambient temperature, and the compensation circuit for compensating for the grades of the resistance values of the heating resistors resulting from a manufacturing error between the thermal heads, and therefore, there is provided a thermal head driving device which is greatly improved in printing quality and reliability as compared with the conventional printer having only one of such three circuits, and which is very useful to provide a printer of high quality.

What we claim is:

1. A driving device connected to a source of printing pulses for driving a thermal head that includes a plurality of heating resistors, said driving device comprising:

a driving circuit for applying a current to drive said thermal head in response to printing pulses;

a safety circuit connected to said source and to said driving circuit for limiting the duration of the printing pulses applied to drive said thermal head to a predetermined duration; and a temperature correcting circuit connected to said safety circuit for varying the voltage of printing pulses applied by said safety circuit to said driving circuit in accordance with the ambient temperature and for maintaining constant the current applied to said thermal head by said driving circuit in response to the printing pulses, while controlling the bias to said driving circuit.

2. A thermal head driving device according to claim 1, wherein said driving circuit comprises a transistor element, and said temperature correcting circuit comprises a thermistor element for adjusting the temperature characteristics of said transistor element.

3. A driving device connected to a source of printing pulses for driving a thermal head that includes a plurality of heating resistors, said driving device comprising:

a driving circuit for applying a current to drive said thermal head in response to printing pulses;

a temperature correcting circuit connected to said source and to said driving circuit for varying the voltage of printing pulses applied to said driving circuit to drive said thermal head in accordance with the ambient temperature and for maintaining constant the current applied by said driving circuit in response to the printing pulses to said thermal head while controlling the bias to said driving circuit; and a compensation circuit comprising a plurality of resistor elements each connected at one terminal to said temperature correcting circuit and through a disconnectable signal wire at another terminal to ground for compensating for the grade of resistance of said thermal head.

4. A thermal head driving device according to claim 3, wherein said driving circuit comprises a transistor element, and said temperature correcting circuit comprises a thermistor element connected commonly to said one terminal of each of said resistor elements of said compensation circuit to adjust the temperature characteristics of said transistor element.

5. A thermal head driving device according to claim 3 or 4, wherein said compensation circuit compensates for the grade of resistance of said thermal head in accordance with the number of said signal wires disconnected from its associated resistor element.

6. A driving device connected to a source of printing pulses for driving a thermal head that includes a plurality of heating resistors, said driving device comprising a safety circuit connected to said source and to said thermal head for limiting the duration of printing pulses applied to drive said thermal head to a predetermined duration; and a compensation circuit including a plurality of resistor elements each connected at one terminal to said safety circuit and through a disconnectable signal wire at another terminal to ground for compensating for the grade of resistance of said thermal head by varying the voltage of the printing pulses applied by said safety circuit to said thermal head.

7. A thermal head driving device according to claim 6, wherein said safety circuit comprises a capacitor element for converting the printing pulses applied to drive said thermal head into signals of an exponential waveform, and a transistor element for detecting a change in the level of each exponential waveform signal applied from said capacitor element and for limiting the pulse width of the signal applied.

8. A thermal head driving device according to claim 6, wherein said compensation circuit compensates for the grade of resistance of said thermal head in accordance with the number of said signal wires disconnected from its associated resistor element.

9. A driving device connected to a source of printing pulses for driving a thermal head that includes a plurality of heating resistors, said driving device comprising:

a driving circuit for applying a current to drive said thermal head in response to printing pulses;

a safety circuit connected to said source and to said driving circuit for limiting the duration of the printing pulses applied to drive said thermal head to a predetermined duration;

a temperature correcting circuit connected to said safety circuit for varying the voltage of printing pulses applied by said safety circuit to said driving circuit in accordance with the ambient temperature and for maintaining constant the current supplied to said thermal head by said driving circuit in response to the printing pulses while controlling the bias of said driving circuit; and a compensation circuit comprising a plurality of resistor elements each having one terminal connected to said temperature correcting circuit and through a disconnectable signal wire at another terminal to ground for compensating for the grade of resistance of said thermal head.

10. A thermal head driving device according to claim 9, wherein said compensation circuit varies the biasing voltage of said driving circuit in accordance with the number of said signal wires disconnected from a corresponding number of said plurality of resistor elements, to thereby compensate for the grade of resistance of said thermal head.

11. A thermal head driving device according to claim 9 or 10, wherein said driving circuit comprises a transistor element, and said temperature correcting circuit comprises a thermistor element having a common terminal connected to said one terminal of each of the plurality of resistor elements of said compensation circuit for compensating for temperature characteristics of said transistor element.

12. A thermal head driving device according to claim 9 or 10, wherein said safety circuit comprises a capacitor element for converting each of the printing pulses applied to drive said thermal head into an exponential waveform signal, and a transistor element for detecting a change in the level of each exponential waveform signal applied from said capacitor element and for limiting the pulse width of the signal to a predetermined duration.

13. A thermal head driving device according to claim 9, wherein said driving circuit comprises a first transistor element, said temperature correcting circuit comprises a thermistor element having a common terminal connected to said one terminal of each of said plurality of resistor elements of said compensation circuit for compensating for the temperature characteristics of said first transistor element, and said safety circuit comprises a capacitor element for converting each of the printing signals applied to drive said thermal head into an exponential waveform signal, and a second transistor element for detecting a change in level of each exponential waveform signal applied from said capacitor element and for limiting the pulse width of the signal to a predetermined duration.

14. A driving device connected to a source of printing pulses for driving a thermal head that includes a plurality of heating resistors, said driving device comprising:

a first transistor for applying a current to drive said thermal head in response to the printing pulses;

a safety circuit connected to said source and to said first transistor, and comprising a capacitor element for converting each of the printing pulses applied to drive said thermal head into an exponential waveform signal and a second transistor element for detecting a change in the level of each exponential waveform signal applied from said capacitor element and for limiting the pulse width of the signal to a predetermined duration;

a thermistor connected to said safety circuit for varying the voltage of the signals applied by said safety circuit to said first transistor in accordance with a change in ambient temperature and for maintaining constant the current supplied to said thermal head by said first transistor in response to said signals while controlling the bias of said first transistor; and a compensation circuit including a plurality of resistor elements each having one terminal connected to a terminal common to said thermistor and through a disconnectable signal wire at another terminal to ground for compensating for the grade of resistance of said thermal head.

15. A thermal head driving device according to claim 14, wherein said compensation circuit is adapted to vary the biasing voltage of said first transistor by having at least one of said signal wires selectively disconnected from said one terminal of the associated one of said plurality of resistor elements, to thereby compensate for the grade of resistance of said thermal head.

* * * * *